US008046273B2

(12) United States Patent
Welter et al.

(10) Patent No.: US 8,046,273 B2
(45) Date of Patent: Oct. 25, 2011

(54) SYSTEM AND METHOD FOR PURCHASE ORDER CREATION, PROCUREMENT, AND CONTROLLING

(75) Inventors: Markus Welter, Ottweiler (DE); Holger Wittmer, Völklingen (DE); Andreas Freitag, Saarbrücken (DE); Ziad Abo-Hasna, St. Ingbert (DE)

(73) Assignee: SAP AG (DE)

( * ) Notice: Subject to any disclaimer, the term of this patent is extended or adjusted under 35 U.S.C. 154(b) by 913 days.

(21) Appl. No.: 11/075,392

(22) Filed: Mar. 8, 2005

(65) Prior Publication Data

US 2005/0203813 A1  Sep. 15, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 30/00* (2006.01)

(52) U.S. Cl. ............... 705/26.8; 705/26.81; 705/26.82; 705/28; 705/29

(58) Field of Classification Search .................. 705/26, 705/27

See application file for complete search history.

(56) References Cited

U.S. PATENT DOCUMENTS

| 4,750,119 A | 6/1988 | Cohen et al. |
| 4,752,877 A | 6/1988 | Roberts et al. |
| 5,297,250 A | 3/1994 | Leroy et al. |
| 5,313,392 A | 5/1994 | Temma et al. |
| 5,315,508 A | 5/1994 | Bain et al. |
| 5,325,304 A | 6/1994 | Aoki |
| 5,400,253 A | 3/1995 | O'Connor |
| 5,500,513 A | 3/1996 | Langhans et al. |
| 5,615,109 A | 3/1997 | Eder |
| 5,621,201 A | 4/1997 | Langhans et al. |
| 5,710,578 A | 1/1998 | Beauregard et al. |
| 5,758,327 A | 5/1998 | Gardner et al. |
| H1743 H | 8/1998 | Graves et al. |
| 5,796,614 A | 8/1998 | Yamada |

(Continued)

FOREIGN PATENT DOCUMENTS

JP  2004-30343 A  1/2004

(Continued)

OTHER PUBLICATIONS

"The choices for taking inventory—and control: a menu of possibilites is available to stores that want to install—or upgrade—computer inventory control systems" Stander, Bella. Publishers Weekly, vol. 242, No. 12, p. 33(3), Mar. 20, 1995. Retrieved via Dialog on Dec. 17, 2010.*

(Continued)

*Primary Examiner* — Michael A. Misiaszek
(74) *Attorney, Agent, or Firm* — Foley & Lardner LLP

(57) ABSTRACT

A computer-implemented system for managing purchasing orders for a plurality of items to be purchased is shown. The system includes a computer implemented purchase order management interface, the purchase order management interface configured to display data associated with a plurality of purchase orders, a purchase order generation application configured to allow a user to generate a new purchase order or modify an existing purchase order, a purchase order procurement application configured to allow a user to obtain financing for purchase order that has failed a budget check, and an event-driven purchase order controlling application configured to allow a user to review existing purchase orders for event-driven information related to the purchase order.

20 Claims, 9 Drawing Sheets

U.S. PATENT DOCUMENTS

| | | |
|---|---|---|
| 5,832,496 A | 11/1998 | Anand et al. |
| 5,870,716 A | 2/1999 | Sugiyama et al. |
| 5,878,400 A | 3/1999 | Carter, III |
| 5,920,846 A | 7/1999 | Storch et al. |
| 5,930,769 A | 7/1999 | Rose |
| 5,930,771 A | 7/1999 | Stapp |
| 5,943,652 A | 8/1999 | Sisley et al. |
| 5,953,707 A | 9/1999 | Huang et al. |
| 5,999,914 A | 12/1999 | Blinn et al. |
| 6,014,648 A | 1/2000 | Brennan |
| 6,029,139 A | 2/2000 | Cunningham et al. |
| 6,064,984 A | 5/2000 | Ferguson et al. |
| 6,115,690 A | 9/2000 | Wong |
| 6,151,588 A | 11/2000 | Tozzoli et al. |
| 6,185,550 B1 | 2/2001 | Snow et al. |
| 6,260,024 B1 | 7/2001 | Shkedy |
| 6,260,241 B1 | 7/2001 | Brennan |
| 6,285,916 B1 | 9/2001 | Kadaba et al. |
| 6,341,351 B1 | 1/2002 | Muralidhran et al. |
| 6,366,890 B1 | 4/2002 | Usrey |
| 6,473,794 B1 | 10/2002 | Guheen et al. |
| 6,484,149 B1 | 11/2002 | Jammes et al. |
| 6,505,093 B1 | 1/2003 | Thatcher et al. |
| 6,507,851 B1 | 1/2003 | Fujiwara et al. |
| 6,647,380 B1 | 11/2003 | Yotsukura |
| 6,671,676 B1 | 12/2003 | Shacham |
| 6,701,299 B2 | 3/2004 | Kraisser et al. |
| 6,721,715 B2 | 4/2004 | Nemzow |
| 6,725,204 B1 | 4/2004 | Gusley |
| 6,868,528 B2 | 3/2005 | Roberts |
| 6,910,017 B1 | 6/2005 | Woo et al. |
| 6,980,966 B1 | 12/2005 | Sobrado et al. |
| 7,016,859 B2 | 3/2006 | Whitesage |
| 7,080,030 B2 | 7/2006 | Eglen et al. |
| 7,082,408 B1 | 7/2006 | Baumann et al. |
| 7,082,426 B2 | 7/2006 | Musgrove et al. |
| 7,092,929 B1 | 8/2006 | Dvorak et al. |
| 7,096,189 B1 | 8/2006 | Srinivasan |
| 7,107,268 B1 | 9/2006 | Zawadzki et al. |
| 7,117,165 B1 | 10/2006 | Adams et al. |
| 7,124,098 B2 | 10/2006 | Hopson et al. |
| 7,124,984 B2 | 10/2006 | Yokouchi et al. |
| 7,139,731 B1 | 11/2006 | Alvin |
| 7,188,080 B1 | 3/2007 | Walker et al. |
| 7,216,086 B1 | 5/2007 | Grosvenor et al. |
| 7,283,975 B2 | 10/2007 | Broughton |
| 7,343,315 B2 | 3/2008 | Wittmer et al. |
| 7,346,656 B2 | 3/2008 | Worthen |
| 7,499,877 B2 | 3/2009 | Carr et al. |
| 7,516,083 B1 | 4/2009 | Dvorak et al. |
| 7,523,048 B1 | 4/2009 | Dvorak |
| 7,574,383 B1 | 8/2009 | Parasnis et al. |
| 7,647,250 B2 | 1/2010 | Abo-Hasna et al. |
| 7,660,742 B2 | 2/2010 | Biwer et al. |
| 7,693,749 B2 | 4/2010 | Wittmer et al. |
| 7,742,948 B2 | 6/2010 | Welter et al. |
| 7,805,335 B2 | 9/2010 | Wittmer et al. |
| 7,813,949 B2 | 10/2010 | Grendel et al. |
| 7,831,487 B2 | 11/2010 | Abo-Hasna et al. |
| 7,853,491 B2 | 12/2010 | Wittmer et al. |
| 2001/0011295 A1 | 8/2001 | Kobayashi et al. |
| 2001/0013731 A1 | 8/2001 | Shinohara et al. |
| 2001/0019332 A1 | 9/2001 | Fisher |
| 2001/0019778 A1 | 9/2001 | Gardaz et al. |
| 2001/0032130 A1 | 10/2001 | Gabos et al. |
| 2001/0034673 A1 | 10/2001 | Yang et al. |
| 2001/0039517 A1 | 11/2001 | Kawakatsu |
| 2001/0049634 A1 | 12/2001 | Stewart |
| 2002/0012390 A1 | 1/2002 | Kim |
| 2002/0013731 A1 | 1/2002 | Bright et al. |
| 2002/0019778 A1 | 2/2002 | Isaacson et al. |
| 2002/0023500 A1 | 2/2002 | Chikuan et al. |
| 2002/0026368 A1 | 2/2002 | Carter, III |
| 2002/0048369 A1 | 4/2002 | Ginter et al. |
| 2002/0059108 A1 | 5/2002 | Okura et al. |
| 2002/0059122 A1 | 5/2002 | Inoue et al. |
| 2002/0062314 A1 | 5/2002 | Hisasue et al. |
| 2002/0072986 A1 | 6/2002 | Aram |
| 2002/0073114 A1 | 6/2002 | Nicastro et al. |
| 2002/0078159 A1 | 6/2002 | Petrogiannis et al. |
| 2002/0099563 A1 | 7/2002 | Adendorff et al. |
| 2002/0099579 A1 | 7/2002 | Stowell et al. |
| 2002/0107713 A1 | 8/2002 | Hawkins |
| 2002/0111892 A1 | 8/2002 | Sharp et al. |
| 2002/0116241 A1 | 8/2002 | Sandhu et al. |
| 2002/0120523 A1 | 8/2002 | Yang |
| 2002/0120533 A1 | 8/2002 | Wiesenmaier |
| 2002/0123930 A1 | 9/2002 | Boyd et al. |
| 2002/0128946 A1 | 9/2002 | Chehade et al. |
| 2002/0138290 A1 | 9/2002 | Metcalfe et al. |
| 2002/0138360 A1* | 9/2002 | Inoue et al. ............ 705/26 |
| 2002/0143644 A1 | 10/2002 | Tosun et al. |
| 2002/0143690 A1 | 10/2002 | Mahajan et al. |
| 2002/0147622 A1 | 10/2002 | Drolet et al. |
| 2002/0147668 A1 | 10/2002 | Smith et al. |
| 2002/0152128 A1 | 10/2002 | Walch et al. |
| 2002/0156858 A1 | 10/2002 | Hunter |
| 2002/0165782 A1 | 11/2002 | Falkenstein et al. |
| 2002/0184116 A1 | 12/2002 | Tam et al. |
| 2002/0188499 A1 | 12/2002 | Jenkins et al. |
| 2002/0188524 A1 | 12/2002 | Shimizu |
| 2003/0023500 A1 | 1/2003 | Boies et al. |
| 2003/0028393 A1 | 2/2003 | Coulston et al. |
| 2003/0028437 A1 | 2/2003 | Grant et al. |
| 2003/0033231 A1 | 2/2003 | Turner et al. |
| 2003/0046120 A1 | 3/2003 | Hoffman et al. |
| 2003/0046195 A1 | 3/2003 | Mao |
| 2003/0050852 A1 | 3/2003 | Liao et al. |
| 2003/0065574 A1 | 4/2003 | Lawrence |
| 2003/0074269 A1* | 4/2003 | Viswanath ............ 705/26 |
| 2003/0083961 A1 | 5/2003 | Bezos et al. |
| 2003/0120528 A1 | 6/2003 | Kruk et al. |
| 2003/0126024 A1 | 7/2003 | Crampton et al. |
| 2003/0128392 A1 | 7/2003 | O'Brien et al. |
| 2003/0144916 A1 | 7/2003 | Mumm et al. |
| 2003/0149578 A1 | 8/2003 | Wong |
| 2003/0149631 A1 | 8/2003 | Crampton et al. |
| 2003/0149674 A1 | 8/2003 | Good et al. |
| 2003/0158791 A1 | 8/2003 | Gilberto et al. |
| 2003/0171998 A1 | 9/2003 | Pujar et al. |
| 2003/0172007 A1 | 9/2003 | Helmolt et al. |
| 2003/0187767 A1 | 10/2003 | Crites et al. |
| 2003/0200150 A1 | 10/2003 | Westcott et al. |
| 2003/0200156 A1 | 10/2003 | Roseman et al. |
| 2003/0200168 A1 | 10/2003 | Cullen, III et al. |
| 2003/0208365 A1 | 11/2003 | Avery et al. |
| 2003/0217024 A1 | 11/2003 | Kocher |
| 2003/0229502 A1 | 12/2003 | Woo |
| 2003/0236721 A1 | 12/2003 | Plumer et al. |
| 2004/0006522 A1 | 1/2004 | Keane et al. |
| 2004/0010463 A1 | 1/2004 | Hahn-Carlson et al. |
| 2004/0015367 A1 | 1/2004 | Nicastro et al. |
| 2004/0019528 A1 | 1/2004 | Broussard et al. |
| 2004/0098358 A1 | 5/2004 | Roediger |
| 2004/0122689 A1 | 6/2004 | Dailey et al. |
| 2004/0158507 A1 | 8/2004 | Meek, Jr. et al. |
| 2004/0162763 A1 | 8/2004 | Hoskin et al. |
| 2004/0172321 A1 | 9/2004 | Vemula et al. |
| 2004/0186763 A1 | 9/2004 | Smith |
| 2004/0186765 A1 | 9/2004 | Kataoka |
| 2004/0186783 A1 | 9/2004 | Knight et al. |
| 2004/0210489 A1 | 10/2004 | Jackson et al. |
| 2004/0220861 A1 | 11/2004 | Morciniec et al. |
| 2004/0249722 A1 | 12/2004 | Sugamura et al. |
| 2004/0267674 A1 | 12/2004 | Feng et al. |
| 2005/0015303 A1 | 1/2005 | Dubin et al. |
| 2005/0055283 A1 | 3/2005 | Zarovinsky |
| 2005/0060270 A1 | 3/2005 | Ramakrishnan |
| 2005/0075915 A1 | 4/2005 | Clarkson |
| 2005/0075941 A1 | 4/2005 | Jetter et al. |
| 2005/0086122 A1 | 4/2005 | Cirulli et al. |
| 2005/0086125 A1 | 4/2005 | Cirulli et al. |
| 2005/0096122 A1 | 5/2005 | Nireki et al. |
| 2005/0096125 A1 | 5/2005 | LeMay et al. |
| 2005/0096963 A1 | 5/2005 | Myr et al. |
| 2005/0102175 A1* | 5/2005 | Dudat et al. ............ 705/10 |
| 2005/0102192 A1 | 5/2005 | Gerrits et al. |

| | | | |
|---|---|---|---|
| 2005/0102227 A1 | 5/2005 | Solonchev | |
| 2005/0131807 A1 | 6/2005 | Schaefer et al. | |
| 2005/0165659 A1 | 7/2005 | Gruber | |
| 2005/0171825 A1 | 8/2005 | Denton et al. | |
| 2005/0197912 A1 | 9/2005 | Wittmer et al. | |
| 2005/0197913 A1 | 9/2005 | Grendel et al. | |
| 2005/0197914 A1 | 9/2005 | Welter et al. | |
| 2005/0197915 A1 | 9/2005 | Biwer et al. | |
| 2005/0197918 A1 | 9/2005 | Wittmer et al. | |
| 2005/0197921 A1 | 9/2005 | Abo-Hasna et al. | |
| 2005/0197949 A1 | 9/2005 | Welter et al. | |
| 2005/0203813 A1 | 9/2005 | Welter et al. | |
| 2005/0216325 A1 | 9/2005 | Ziad et al. | |
| 2005/0216357 A1 | 9/2005 | Wittmer et al. | |
| 2005/0216359 A1 | 9/2005 | Welter et al. | |
| 2005/0216375 A1 | 9/2005 | Grendel et al. | |
| 2005/0235020 A1 | 10/2005 | Gabelmann et al. | |
| 2005/0240488 A1 | 10/2005 | Grendel et al. | |
| 2005/0243792 A1 | 11/2005 | Simon et al. | |
| 2005/0246482 A1 | 11/2005 | Gabelmann et al. | |
| 2005/0251734 A1 | 11/2005 | Gabelmann et al. | |
| 2006/0015417 A1 | 1/2006 | Wittmer et al. | |
| 2006/0020512 A1 | 1/2006 | Lucas et al. | |
| 2006/0036507 A1 | 2/2006 | Pujar et al. | |
| 2006/0074746 A1 | 4/2006 | Kline et al. | |
| 2006/0074747 A1 | 4/2006 | Kline et al. | |
| 2006/0074748 A1 | 4/2006 | Kline et al. | |
| 2006/0074749 A1 | 4/2006 | Kline et al. | |
| 2006/0074751 A1 | 4/2006 | Kline et al. | |
| 2006/0112099 A1 | 5/2006 | Musgrove et al. | |
| 2006/0184401 A1 | 8/2006 | DelGaudio et al. | |
| 2007/0050272 A1* | 3/2007 | Godlewski et al. | 705/28 |
| 2010/0049582 A1 | 2/2010 | Abo-Hasna et al. | |
| 2010/0100455 A1* | 4/2010 | Song | 705/26 |

FOREIGN PATENT DOCUMENTS

| | | |
|---|---|---|
| WO | WO 99/45450 A2 | 9/1999 |
| WO | WO 01/71635 A2 | 9/2001 |

OTHER PUBLICATIONS

U.S. Appl. No. 60/374,892, filed Apr. 22, 2002, Krajec, Russell.
Anon., "(A lot of) life after H. Ross: Electronic Data Systems", *Financial World*, vol. 162, No. 22, , Nov. 9, 1993 (p. 50 (2)).
Author unknown, "Staffware: Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001 (p. 1.).
"Beyond Markdown Management", summer/autumn 03, *the 4caster*, Iss. 4, vol. 2.
Brown, Timothy Charles, "The Effects of Assortment Composition Flexibility on Operating Efficiency", (Abstract Only), *Dissertation Abstracts International*, vol. 55/08-A, available at least by 1994, (p. 2458).
Melcher, Rachel, "Local tech firm creates retail markdown tool", Mar. 24, 2000, *Cincinnati Business Courier* (3 pgs.).
Profitlogic, available at http://web.archive.org/web/2002060311838/, available at least by Apr. 15, 2005 (22 pp.).
"Retailers Manage Markdown Challenges Using i2 Solutions", Jan. 13, 2003, NFR 92nd Annual Convention & Expo (2 pgs.).
Subrahmanyan et al., "Developing optimal pricing and inventory policies for retailers who face uncertain demand", *Journal of Retailing*, vol. 72, No. 1, Spring, 1996 (p. 7(24)).
Wilson, Glenn T., "Changing the process of production", *Industrial Management*, vol. 37, No. 1, Jan./Feb. 1995 (pp. 1-2).
Abraham et al., "An Implemented System for Improving Promotion Productivity Using Store Scanner Data", Marketing Science, Summer 1993, vol. 12, No. 3, pp. 248-269.
Kelkar et al., Price Modeling in Standards for Electronic Product Catalogs Based on XML, 2002, pp. 366-375.
Srinivasan et al.., Concepts and strategy guidelines for designing value enhancing sales promotions, Journal of Product and Brand Management, vol. 7, No. 5, 1998, pp. 410-420.
"New Pegasystems Enterprise Application Provides Central Hub for Proactively Managing Operational Exceptions",Business Wire,(recovered from Dialog database), Feb. 3,2004, 4 pages.

Bartle et al., "A Review of State Procurement and Contracting", Journal of Public Procurement, 2003, vol. 3, Issue 2, pp. 192-214.
Camas, Yuksel, "APS system integration: more challenges [Advanced planned and Schedule]", Materials Management and Distribution, Toronto, Jan. 2001, vol. 46, Iss. 1, 2 pages.
Chen et al., Near-Optimal Pricing and Replenishment Strategies for a Retail/Distribution System, 1D Operations Research, Nov./Dec. 2001, vol. 49, No. 6, pp. 839-853.
Chen et al., "Quantity and Due Date Quoting Available to Promise", Information Systems Frontier, Dec. 2001, vol. 3, No. 4, pp. 477-488.
Der et al., "On-line scheduling of multi-server batch operations.", IIE Transactions, vol. 33, No. 7, Jul. 2001, p. 569.
Goodwin, David R., 1CThe Open-to-Buy System and Accurate Performance Measurement, 1D International Journal of Retail & Distribution Management, Mar./Apr. 1992, vol. 20, Iss. 2, 7 pages.
Jensen et al., "Long-Term Construction Contracts: The Impact of Tamra '88 on Revenue Recognition", Journal of Construction Education, Spring 1997, vol. 2, No. 1, pp. 37-53.
Notice of Allowance for U.S. Appl. No. 10/903,467, mail date Aug. 11, 2010, 13 pages.
Notice of Allowance for U.S. Appl. No. 10/903,867, mail date Feb. 17, 2010, 6 pages.
Notice of Allowance for U.S. Appl. No. 10/903,867, mail date May 27, 2010, 6 pages.
Notice of Allowance for U.S. Appl. No. 10/914,614, mail date Jan. 25, 2008, 7 pages.
Notice of Allowance for U.S. Appl. No. 10/914,614, mail date Oct. 3, 2007, 9 pages.
Notice of Allowance for U.S. Appl. No. 10/932,913, mail date Nov. 16, 2009, 17 pages.
Notice of Allowance for U.S. Appl. No. 10/932,913, mail date Sep. 30, 2009, 26 pages.
Notice of Allowance for U.S. Appl. No. 10/933,127, mail date Feb. 4, 2010, 11 pages.
Notice of Allowance for U.S. Appl. No. 11/047,368, mail date Feb. 14, 2011, 11 pages.
Notice of Allowance for U.S. Appl. No. 11/071,982, mail date Aug. 10, 2009, 15 pages.
Notice of Allowance for U.S. Appl. No. 11/072,000, mail date Jul. 9, 2010, 12 pages.
Notice of Allowance for U.S. Appl. No. 11/074,368, mail date Mar. 16, 2011, 6 pages.
Notice of Allowance for U.S. Appl. No. 11/075,391, mail date Aug. 31, 2009, 18 pages.
Notice of Allowance for U.S. Appl. No. 11/075,393, mail date Jun. 10, 2010, 19 pages.
Office Action for U.S. Appl. No. 10/903,902, mail date Aug. 7, 2008, 8 pages.
Office Action for U.S. Appl. No. 10/903,467, mail date Feb. 3, 2010, 16 pages.
Office Action for U.S. Appl. No. 10/903,467, mail date Jan. 26, 2009, 17 pages.
Office Action for U.S. Appl. No. 10/903,467, mail date Jul. 23, 2009, 17 pages.
Office Action for U.S. Appl. No. 10/903,467, mail date Jun. 11, 2008, 15 pages.
Office Action for U.S. Appl. No. 10/903,467, mail date Mar. 27, 2007, 11 pages.
Office Action for U.S. Appl. No. 10/903,867, mail date Aug. 19, 2008, 10 pages.
Office Action for U.S. Appl. No. 10/903,867, mail date Feb. 25, 2008, 9 pages.
Office Action for U.S. Appl. No. 10/903,867, mail date Mar. 16, 2009, 9 pages.
Office Action for U.S. Appl. No. 10/903,867, mail date Oct. 7, 2009, 9 pages.
Office Action for U.S. Appl. No. 10/903,902, mail date Apr. 23, 2008, 9 pages.
Office Action for U.S. Appl. No. 10/903,902, mail date Feb. 12, 2009, 2 pages.
Office Action for U.S. Appl. No. 10/903,902, mail date Mar. 22, 2007, 7 pages.

Office Action for U.S. Appl. No. 10/903,902, mail date Sep. 13, 2007, 8 pages.
Office Action for U.S. Appl. No. 10/915,263, mail date Apr. 14, 2009, 12 pages.
Office Action for U.S. Appl. No. 10/915,263, mail date Apr. 12, 2010, 14 pages.
Office Action for U.S. Appl. No. 10/915,263, mail date Apr. 28, 2008, 16 pages.
Office Action for U.S. Appl. No. 10/915,263, mail date Jul. 23, 2007, 15 pages.
Office Action for U.S. Appl. No. 10/915,263, mail date Sep. 12, 2008, 11 pages.
Office Action for U.S. Appl. No. 10/915,263, mail date Sep. 9, 2009, 13 pages.
Office Action for U.S. Appl. No. 10/915,707, mail date Apr. 13, 2009, 6 pages.
Office Action for U.S. Appl. No. 10/915,707, mail date Apr. 21, 2006, 9 pages.
Office Action for U.S. Appl. No. 10/915,707, mail date Aug. 28, 2006, 13 pages.
Office Action for U.S. Appl. No. 10/915,707, mail date Dec. 8, 2008, 5 pages.
Office Action for U.S. Appl. No. 10/915,707, mail date Mar. 16, 2010, 13 pages.
Office Action for U.S. Appl. No. 10/915,707, mail date Mar. 28, 2007, 13 pages.
Office Action for U.S. Appl. No. 10/915,707, mail date May 1, 2008, 14 pages.
Office Action for U.S. Appl. No. 10/915,707, mail date Sep. 14, 2009, 11 pages.
Office Action for U.S. Appl. No. 10/932,913, mail date Apr. 1, 2009, 15 pages.
Office Action for U.S. Appl. No. 10/932,913, mail date Aug. 27, 2007, 14 pages.
Office Action for U.S. Appl. No. 10/932,913, mail date Jan. 23, 2007, 15 pages.
Office Action for U.S. Appl. No. 10/932,913, mail date Mar. 20, 2008, 14 pages.
Office Action for U.S. Appl. No. 10/932,913, mail date Sep. 17, 2008, 14 pages.
Office Action for U.S. Appl. No. 10/933,127, mail date Aug. 3, 2009, 26 pages.
Office Action for U.S. Appl. No. 10/933,127, mail date Jul. 16, 2008, 10 pages.
Office Action for U.S. Appl. No. 10/933,127, mail date Jul. 3, 2007, 5 pages.
Office Action for U.S. Appl. No. 10/933,127, mail date Nov. 28, 2007, 7 pages.
Office Action for U.S. Appl. No. 10/981,384, mail date Apr. 29, 2009, 10 pages.
Office Action for U.S. Appl. No. 10/981,384, mail date Jan. 14, 2011, 22 pages.
Office Action for U.S. Appl. No. 10/981,384, mail date Mar. 14, 2008, 7 pages.
Office Action for U.S. Appl. No. 10/981,384, mail date Nov. 23, 2009, 10 pages.
Office Action for U.S. Appl. No. 10/981,384, mail date Oct. 16, 2008, 7 pages.
Office Action for U.S. Appl. No. 11/047,368, mail date Dec. 20, 2007, 15 pages.
Office Action for U.S. Appl. No. 11/047,368, mail date Jul. 24, 2008, 18 pages.
Office Action for U.S. Appl. No. 11/047,368, mail date Jun. 16, 2010, 12 pages.
Office Action for U.S. Appl. No. 11/047,368, mail date Jun. 26, 2007, 14 pages.
Office Action for U.S. Appl. No. 11/047,368, mail date Mar. 4, 2009, 16 pages.
Office Action for U.S. Appl. No. 11/047,368, mail date Nov. 10, 2009, 14 pages.
Office Action for U.S. Appl. No. 11/047,368, mail date Nov. 24, 2010, 11 pages.
Office Action for U.S. Appl. No. 11/071,982, mail date Feb. 13, 2009, 18 pages.
Office Action for U.S. Appl. No. 11/071,982, mail date Jan. 25, 2008, 19 pages.
Office Action for U.S. Appl. No. 11/071,982, mail date May 29, 2008, 20 pages.
Office Action for U.S. Appl. No. 11/071,982, mail date Nov. 18, 2008, 7 pages.
Office Action for U.S. Appl. No. 11/072,000 mail date Jul. 17, 2008, 6 pages.
Office Action for U.S. Appl. No. 11/072,000, mail date Dec. 9, 2008, 10 pages.
Office Action for U.S. Appl. No. 11/072,000, mail date Jun. 11, 2009, 13 pages.
Office Action for U.S. Appl. No. 11/072,000, mail date Nov. 12, 2009, 9 pages.
Office Action for U.S. Appl. No. 11/074,368, mail date Apr. 14, 2009, 13 pages.
Office Action for U.S. Appl. No. 11/074,368, mail date Aug. 19, 2009, 12 pages.
Office Action for U.S. Appl. No. 11/074,368, mail date Aug. 31, 2010, 12 pages.
Office Action for U.S. Appl. No. 11/074,368, mail date Mar. 26, 2008, 12 pages.
Office Action for U.S. Appl. No. 11/074,368, mail date Mar. 29, 2007, 11 pages.
Office Action for U.S. Appl. No. 11/074,368, mail date Mar. 30, 2010, 13 pages.
Office Action for U.S. Appl. No. 11/074,368, mail date Oct. 6, 2006, 8 pages.
Office Action for U.S. Appl. No. 11/074,600, mail date Feb. 18, 2009, 25 pages.
Office Action for U.S. Appl. No. 11/074,600, mail date Feb. 3, 2010, 29 pages.
Office Action for U.S. Appl. No. 11/074,600, mail date Jul. 16, 2009, 27 pages.
Office Action for U.S. Appl. No. 11/074,600, mail date Nov. 26, 2010, 27 pages.
Office Action for U.S. Appl. No. 11/074,600, mail date Sep. 8, 2008, 13 pages.
Office Action for U.S. Appl. No. 11/075,391, mail date Apr. 8, 2008, 5 pages.
Office Action for U.S. Appl. No. 11/075,391, mail date Dec. 11, 2008, 9 pages.
Office Action for U.S. Appl. No. 11/075,391, mail date May 22, 2009, 9 pages.
Office Action for U.S. Appl. No. 11/075,393, mail date Jun. 11, 2009, 26 pages.
Office Action for U.S. Appl. No. 11/075,393, mail date May 28, 2008, 9 pages.
Office Action for U.S. Appl. No. 11/075,393, mail date Nov. 24, 2009, 24 pages.
Office Action for U.S. Appl. No. 12/611,754, mail date Jan. 31, 2011, 15 pages.
Saad et al.; "An Integrated Model for Order Release and Due-Date Demand Management", Journal of Manufacturing Technology Management, 2004, vol. 15, No. 1, 14 pages.
Staib et al., "Purchasing and Supply Chain Management", Air Force Journal of Logistics, Fall 2002, vol. 26, No. 3, 9 pages.

* cited by examiner

FIG. 2

PO Manager Worklist Selection

General Selection
Purch. Organization  205  ESU  to
Purchasing group  001  to
(Late) Order Date
Delivery date
Vendor  LIEF01
Material
Plant
Plant cat.
Firm Deal Indicator
Release Indicator
Order type
☑ My Documents
☑ Order List Entries
☑ Grouped PO Documents
☑ Purchase Orders

Selection by Number
Order List Item Number
Doc.No. GPO  to
PO Document Number  to Selection by Number Current Default Variant:  MHA_TEST

210

ABAP Variant Directory of Program SAPLWRF_POHF_SELSCREEN
Variant catalog for program SAPLWRF_POHF_SELSCREEN
| Variant name | Short descriptn. |
|---|---|
| MAINZ | |
| MAINZ1 | |
| MAINZ2 | |
| MAINZ3 | |
| MAINZ4 | |
| MBI_TEST_01 | |
| MHA_TEST | mha_test |
| ML_TEST2 | |

ZB4 (1) (800)  ld9036 INS

PO Manager

Purch.Org. | Purch.Grp | Ve | Exect. | Default | Selection | Var. | D | R | F | Net... | C...

- Worklist
  - ESU
    - 001
      - UEF01
        - Order List
          - MLVZ
            - NB
              - 20041214
                - 4300014678         39,60 EUR
                - 4300014679         49,20 EUR
                - 4300014682         49,20 EUR
              - 20050104
                - 4300014710          4,10 EUR
              - 20050105
              - 20050610
                - 4300014709          8,20 EUR
                - 4300014683         72,60 EUR
          - Purchase Order
            - MLVZ
              - NB
                - 20041210
                  - 4500030143        14,80 EUR
                  - 4500030144         9,20 EUR
                  - 4500030145         3,30 EUR
                - 20041213
                  - 4500030202       125,10 EUR
                  - 4500030203        88,80 EUR
                - 20041215

310

315

300

ZB4 (1) (800)  ldg036  INS

Order List (Change)

Fast Data Entry

| | OTyp | POrg | PGr | Plant | Vendor | Delivery Date | Material | Order Quantity | OUn | LatestOrd | Crcy | Adopt... | Natorderprice | F... | Per | O... | ... |
|---|---|---|---|---|---|---|---|---|---|---|---|---|---|---|---|---|---|
| | NB | ESU | 001 | MLVZ | LIEF01 | | | | | | | | | | 0 | | |

Adopt Item

Order List Entries

| Sel... | Item No. | ... | Type | Porg | PGr | Vendor | Material | | Matl Group | Plant | Order quantity | Ne |
|---|---|---|---|---|---|---|---|---|---|---|---|---|
| | 2 | | NB | ESU | 001 | LIEF01 | INFODAY4 | hat | WGR_MLA | MLVZ | 22 | |
| | 1 | | NB | ESU | 001 | LIEF01 | INFODAY3 | glove | WGR_MLA | MLVZ | 12 | |
| | 4300014678 | | NB | ESU | 001 | LIEF01 | INFODAY4 | Mütze | WGR_MLA | MLVZ | 12 | |
| | 4300014679 | | NB | ESU | 001 | LIEF01 | INFODAY3 | Handschuhe | WGR_MLA | MLVZ | 12 | |
| | 4300014682 | | NB | ESU | 001 | LIEF01 | INFODAY3 | Handschuhe | WGR_MLA | MLVZ | 12 | |
| | 4300014683 | | NB | ESU | 001 | LIEF01 | INFODAY4 | Mütze | WGR_MLA | MLVZ | 22 | |
| | 4300014709 | | NB | ESU | 001 | LIEF01 | INFODAY3 | glove | WGR_MLA | MLVZ | 2 | |
| | 4300014710 | | NB | ESU | 001 | LIEF01 | INFODAY3 | glove | WGR_MLA | MLVZ | 1 | |

Generate Purchase Order
Generate Grouped PO Document

Date Line

| TC Extern. | ... | TC Description Ext. | International Transportation Chain Descript. | To... | TC Intern | ... | To | Vendor | Material | Store | DC | Inc.. | Tr |
|---|---|---|---|---|---|---|---|---|---|---|---|---|---|
| SCEN_2 | | carsten scenario 2 | | | | | 2 | LIEF01 | INFODAY4 | MLVZ | CIF | IS | |

FIG. 9

SYSTEM AND METHOD FOR PURCHASE ORDER CREATION, PROCUREMENT, AND CONTROLLING

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND OF THE INVENTION

The present invention relates generally to the field of managing procurement. More particularly, the present invention relates to a system and method for managing a purchasing process.

Providers of retail sales articles and services must seek to provide the right product, at the right place, at the right time. Particularly, with regard to sales of retail fashion articles, these articles often have a short life cycle, and new articles have to be presented quite frequently. At the same time, the consumers demand a wide assortment variety. Accordingly, large numbers of different fashion articles often have to be processed and procured within extremely short time frames. Alternatively, the procurement process may involve extended ordering times, wherein an order must be placed 6 months in advance.

Further, tracking inventory and budgets for seasonal items can be important to the profitability of a business. For example, identifying a particularly well selling items and ordering additional quantities to arrive on time and within a prescribed budget may increase the profitability of a retail location. Accordingly, it is important for a business to carefully plan and schedule purchasing orders for retail sales articles and services to ensure on-time procurement or scheduling within budget constraints.

The amount of information and the number of operations that are made available to a manger of multiple workbenches that is responsible for a large number of purchase orders can grow to be prohibitive. For example, a manager may be required to coordinate a large number of purchase orders, performing operations such as budget approval, coordinating delivery, managing missed delivery, updating orders based on current volumes, etc. Further, the manager may be responsible for a large number of purchase orders and need a system and method for grouping and coordinating the large volume, but also may need a system and method that allows drilling down through the data to access any particular purchase order to see status, make changes, etc.

In view of the foregoing, it would be beneficial to provide a system and method for managing purchase orders for sales articles and services to be purchased. It would further be beneficial to provide a purchase order manager configured to provide a single interface allowing access to underlying functionality allowing the user to manage the purchase orders. It would be further beneficial to provide a purchase order manager which may be configured to allow grouping of purchase orders to facilitate management of the underlying purchase orders.

SUMMARY

According to an exemplary embodiment, a computer-implemented system for managing purchasing orders for a plurality of items to be purchased is shown. The system includes a computer implemented purchase order management interface, the purchase order management interface configured to display data associated with a plurality of purchase orders, a purchase order generation application configured to allow a user to generate a new purchase order or modify an existing purchase order, a purchase order procurement application configured to allow a user to obtain financing for purchase order that has failed a budget check, and an event-driven purchase order controlling application configured to allow a user to review existing purchase orders for event-driven information related to the purchase order.

According to another exemplary embodiment, a computer-implemented system for managing purchasing orders for a plurality of items to be purchased is shown. The system includes a purchase order management interface means configured to display data associated with a plurality of purchase orders, a purchase order generation means configured to allow a user to generate a new purchase order or modify an existing purchase order, a purchase order procurement means configured to allow a user to obtain financing for purchase order that has failed a budget check, and an event-driven purchase order controlling means configured to allow a user to review existing purchase orders for event-driven information related to the purchase order.

According to another exemplary embodiment, a program product for managing purchasing data for a plurality of items to be purchased is shown. The program product includes machine-readable program code for causing, when executed, one or more machines to perform the following method steps. The steps include receiving an request to generate a purchasing order for a retail sales item, generating a purchasing order based on the request and received purchase order information, the purchase order information including at least one of a retail item identifier, a retail item quantity, a retail item price, and a projected delivery date, perform an open to buy check based on the received purchase order information to determine whether current financing is sufficient to complete the purchase order, and displaying a plurality of events associated with the purchase order.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 2 is a worklist selection screen configured to allow a user to select a worklist of order list items based on a personal variant, according to an exemplary embodiment;

FIG. 3 is a worklist interface configured to allow a user to manage order list items, according to an exemplary embodiment;

FIG. 5 is the worklist interface of FIG. 3, further displaying an application interface based on a selected function, according to an exemplary embodiment;

FIG. 6 is the application interface of FIG. 3 after the worklist interface has been closed, according to an exemplary embodiment;

FIG. 7 is an order generator interface configured to include one or more toolbar icons associated with application to be performed using the generated listing of order list items, according to an exemplary embodiment;

FIG. 9 is a purchase order controlling interface configured to allow a user to maintain and perform functions associated with purchase orders based on events that have occurred related to the purchase orders, according to an exemplary embodiment.

DETAILED DESCRIPTION

Figure 1:
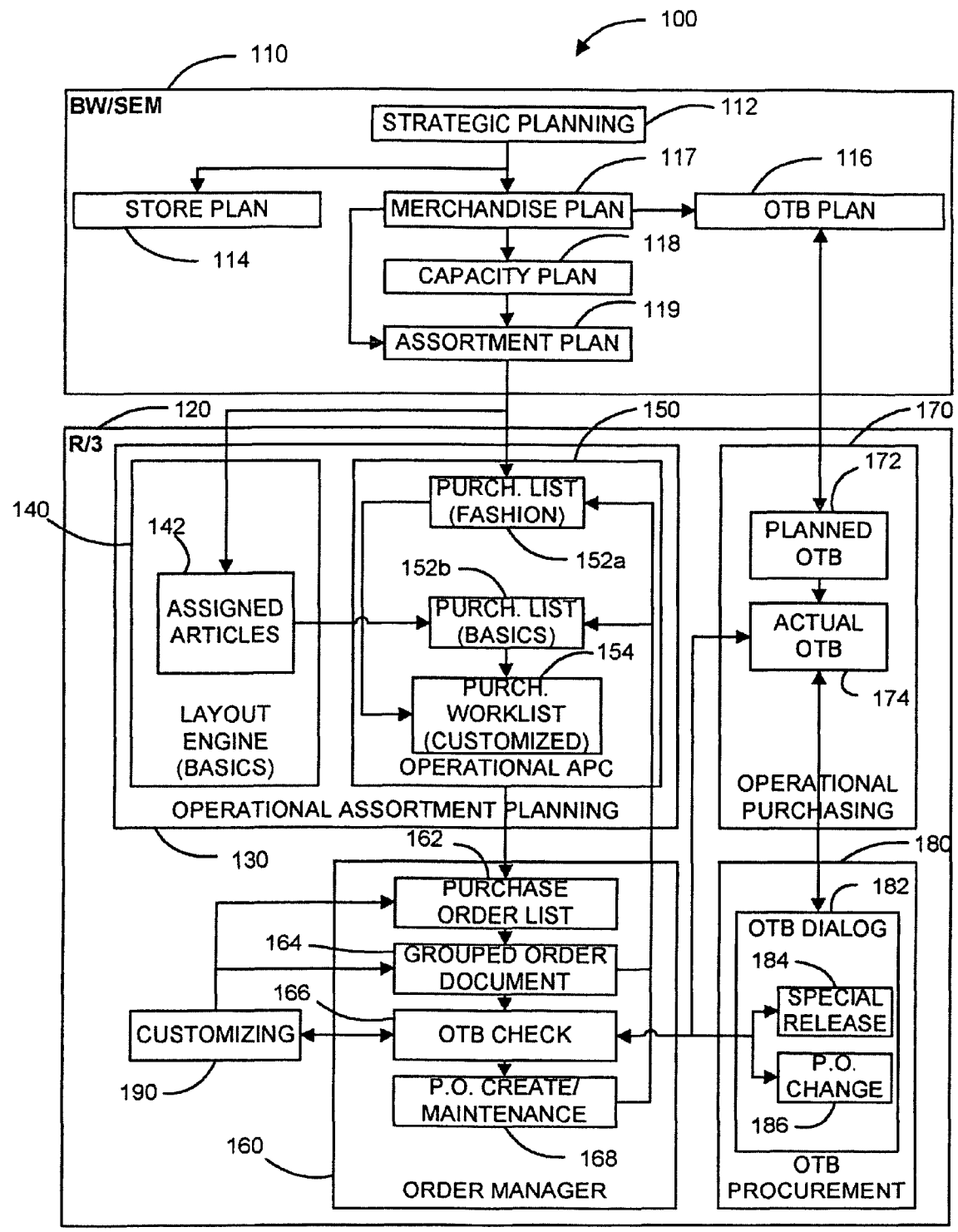
FIG. 1 is an data flow diagram illustrating a system for facilitating planning and procurement of retail sales articles and services according to an exemplary embodiment.

FIG. 1 illustrates a system 100 for facilitating planning and procurement of retail sales articles and services according to an exemplary embodiment. System 100 is illustrated as including a back end system 110 (identified as "BW/SEM") and a front end system 120 (identified as "R/3"). In another embodiment, a single integrated system may be used in place of back end system 110 and front end system 120. System 100 may be implemented as a single system, a distributed system, or any combination thereof. System 100 may be implemented using a single computing system, a plurality of computing systems, software, hardware, or any other system or combination of systems to perform the functions described herein. System 100 may be used, for example, to generate and manage purchase orders for retail sales articles and services using a purchase order management workbench.

Back end system 110 is a data repository configured to receive, sort, process, and store retail sales data, as well as to facilitate planning, provide reporting, and provide other functions associated with managing sales data using one or more functions and/or components. For example, in the illustrated embodiment, back end system 110 includes a strategic planning function 112. Strategic planning function 112 may be used to facilitate an overall business financial plan which defines the retailer's financial goals (e.g., revenues, gross margins, etc.), planned expenses (e.g., inventory, marketing, etc.), and budgets. Accordingly, strategic planning function 112 may be used to generate a store plan 114, an "Open To Buy" (OTB) plan 116, a merchandise plan 117, a capacity plan 118, and an assortment plan 119. According to other exemplary embodiments, back end system 110 may include additional, fewer, and/or different functions.

Store plan 114 may be a plan in which revenues and costs are based on factors within a store hierarchy such as regional marketing, competition, demographic shifts and preferences, and events. OTB plan 116 is derived from merchandise plan 117 and may be a plan designed to maximize turnover potential and minimize capital investment and stockholding costs. OTB planning data may include, for example, an extrapolated amount of available budget for procuring a retail sales article. Merchandise plan 117 may define target purchasing, sales, margin, and inventory levels that are consistent with the overall business plan. Capacity plan 118 is derived from merchandise plan 117 and may be a plan which takes into account the available shelf and/or floor space in a particular store or group of stores in order to determine an optimal number of certain types of retail sales articles to be procured for the store or group of stores.

Assortment plan 119 is based on merchandise plan 117 (and optionally on capacity plan 118 for certain articles) and may be a plan which defines ranges of retail sales articles (e.g., colors and sizes) that may be assigned to a particular grouping of stores. Assortment plan 119 may form the basis for selecting, procuring, and allocating quantities of particular retail sales articles. For example, in the illustrated embodiment, assortment planning data from assortment plan 119 is provided to front-end system 120 in order to facilitate generation and management of purchase orders for the associated retail sales articles.

Front end system 120 is communicatively coupled to back end system 110 and is similarly configured to receive, sort, process, and store retail sales data, as well as to facilitate planning, provide reporting, and provide other functions associated with managing sales data using one or more functions and/or components and in conjunction with back end system 110. For example, in the illustrated embodiment, front end system 120 includes operational assortment planning system 130, order manager system 160, operational purchasing system 170, and OTB procurement system 180. According to other exemplary embodiments, front-end system 120 may include additional, fewer, and/or different functions.

Operational assortment planning system 130 is configured to receive strategic planning data, such as merchandise plan data 117, capacity plan data 118, and assortment planning data 119, from back end system 110, to facilitate refinement and/or addition of detail to the strategic planning data (e.g., specific retail sales articles and quantities to be procured for specific stores during specific periods), and to distribute the data to other downstream processes. In the illustrated embodiment, operational assortment planning system 130 includes a layout engine 140 and an operative assortment planning and control (APC) engine 150. Data from layout engine 140 is passed on to APC engine 150 where it is processed and distributed to downstream processes.

Layout engine 140 is configured to receive strategic planning data from back end system 110, such as capacity data 118 and assortment planning data 119, and to use this data to assign, for example, certain types of retail sales articles to specific locations or layouts according to the available capacity in a store or group of stores. For example, in the illustrated embodiment, layout engine 140 may be used to assign basic, repeat, or "stackable" retail sales articles to a particular layout according to available capacities. In other embodiments, layout engine 140 may be used in conjunction with other types of retail sales articles. Layout data, such as assignments 142 of specific retail sales articles to a particular layout is then passed on to APC engine 150.

APC engine 150 is configured to receive strategic planning data from back end system 110 via an inbound interface, and/or assigned article data 142 from layout engine 140, and to determine groupings and quantities of specific retail sales articles that are to be procured during a specific period and delivered to a specific store or group of stores. By way of example, the following strategic planning data may be "pushed" (or written) or "pulled" (or read) by APC engine 150:

(i) Key performance indicator "fixed initial stock-up" (on a quantity and value basis: purchase price, sales price) at various levels (e.g., article hierarchy node, season/season year, rollout, global assortments assigned to the hierarchy node) Fixed initial stock-up represents fixed quantities of new merchandise to be procured from a capacity standpoint.

(ii) Key performance indicator "variable initial stock-up" on a quantity and value basis at the same levels. Variable initial stock-up represents quantities of new merchandise to be procured from a sales standpoint (e.g., forecast sales).

(iii) Key performance indicator "putaway quantity" on a quantity and value basis at various levels (e.g., article hierarchy node, season/season year, rollout, distribution center). Putaway quantity represents quantities of an article that are not to be shipped directly to a store, but rather are to be shipped to a distribution center first.

(iv) The number of different generic articles (or single articles) per key performance indicator in the assortments (assortment breadth).

APC engine 150 uses the strategic planning data received from back end system 110 and/or assigned article data 142 received from layout engine 140 to generate output data including planned assortments/store groups that, upon release, are pushed to downstream processes. Output data from APC engine 150 may also include one or more purchasing lists 152 of various types. For example, in the illustrated embodiment, APC engine 150 uses strategic planning data received from back end system 110 to generate one or more purchasing lists 152a for fashion retail sales articles, and uses assigned article data 142 from layout engine 140 to generate one or more purchasing lists 152b for non-fashion retail sales articles such as basics or stackable merchandise.

Purchasing list 152 is a list of retail sales articles and corresponding planned purchasing quantities for selected planning levels (e.g., article hierarchy node/season, season year/rollout/assortment type) in APC engine 150. Each purchasing list 152 includes one or more purchasing list items, which represent the smallest possible unit in each purchasing list. A purchasing list item may include a generic article, variants of the generic article (e.g., color or size ranges), or single articles. A purchasing list item may also include planned quantities that are planned within a purchasing list for a specific store delivery date for the various global assortments and key performance indicators. By way of example, each purchasing list item may include the following information:

(i) Purchasing list item number or identifier. This number allows communication between APC engine 150 and the various operative applications.

(ii) Article number or identifier.

(iii) Characteristic 1 (e.g., "article number-characteristic level"). A data retention level of this type allows APC engine 150 to save confirmed order quantities at the characteristic level and facilitates confirmation as to whether the order quantities for a certain characteristic value deviate from the planned quantities.

(iv) Market buying number. This number allows tracking of specific generic articles that may be moved from one purchasing list to another.

(v) Prices: purchase price and sales price.

(vi) Currencies (e.g., local currency, vendor currency).

(vii) "Price fixed" indicator. This indicator ensures that price determination is not performed for either the purchase or sales price during order processing.

(viii) Total purchase order quantity for articles—planned and actual quantities (for confirmations from the purchase order) and article/characteristic value.

(ix) Vendor.

(x) Supplying site (e.g., distribution center, location for delivery).

(xi) Dates (e.g., store delivery date, distribution center delivery date, latest possible order date), planned and actual dates.

(xii) Fields for confirmations (e.g., confirmations from downstream processes).

(xiii) Status fields for the purchasing list item (e.g., status information from downstream processes).

A portion of an exemplary purchasing list 152 is illustrated in FIG. 7. In this embodiment, data can be entered in purchasing list 152 at three levels: generic article level, color (or size) level, and variant level. The color level may serve as entry help and an inheritance level only, i.e., it is not necessarily a data retention level. In any case, a purchasing list can contain more than one entry for the same article (different delivery dates).

Once the purchasing list items in each purchasing list 152 are compiled and released using APC engine 150, the released purchasing list items are grouped together in a purchasing worklist 154 for transfer to one or more downstream processes. At this point, if a released purchasing list item is cancelled, it may be removed from the worklist. The remaining items in purchasing worklist 154 may then be transferred to one or more downstream processes. This transfer of released purchasing list items may take place automatically at regularly scheduled intervals (e.g., nightly, weekly, etc.) or other intervals.

The transfer of each released purchasing list item may also be customized such that certain data for each released purchasing list item may be included or excluded from transfer, or may be written to a specific location in a downstream process. For example, in one embodiment, the relevant data transferred from APC engine 150 for each released purchasing list item may include:

(i) Purchasing list item number or identifier;

(ii) Article number or identifier;

(iii) Assortment number or identifier;

(iv) Quantity and unit of measure;

(v) Dates (latest) store delivery date, distribution center delivery date, (latest possible) order date;

(vi) Supplying site (e.g., distribution center, location for delivery);

(vii) Vendor; and (viii) Prices that will only apply to a purchase order generated from the purchasing list item.

Order manager system 160 is configured to receive data from APC engine 150 in the form of released purchasing list items, and to generate a corresponding purchase order list 162. According to one embodiment, order manager system 160 creates a corresponding item in purchase order list 162 for each released purchasing list item, article and supplying site (distribution center). This makes it possible to update the data in purchase order list 162 when changes are made in APC engine 150. Because the total purchase order quantity has to be added to order list 162, the planned quantity per assortment may be multiplied by the number of stores assigned to that assortment. This calculation may be performed automatically to update the total purchase order quantity data before it is stored in order list 162. The suitable supplying site (supply source) may also be determined for each store. Once each released purchasing list item is successfully written to the order list, a confirmation is sent to APC engine 150 (e.g., as a status field for the corresponding purchasing list item). Items may also be manually added to purchase order list 162 as "ad-hoc" purchase order list items.

Items in purchase order list 162 for which a purchase order is to be generated are transferred to a grouped procurement list 164. In one embodiment, items in purchase order list 162 for which a purchase order is to be generated may be grouped together for transfer to grouped procurement document 164 according to selected criteria. Grouping criteria for creating and changing purchase orders may include, for example, delivery period, delivery date, contract only, and OTB budget only. Once an item has been transferred to the grouped procurement document 164, a confirmation is sent to APC engine 150 (e.g., as a status field for the corresponding purchasing list item) and the item is removed from purchase order list 162.

Once grouped order document 164 has been prepared, order manager 160 performs an OTB check 166 to verify that budgeted funds are available such that a purchase order may be generated. If OTB check 166 is successful, a confirmation may be sent to APC engine 150 (e.g., as a status field for the corresponding purchasing list item) and order manager system 160 may then generate a purchase order 168. If OTB check 166 is not successful, a failure message may be sent to APC engine 150 (e.g., as a status field for the corresponding purchasing list item). The grouped purchase order document may then need to be modified and/or specially authorized such that a purchase order may be generated.

Operational purchasing system 170 is configured to perform OTB check 166 in conjunction with order manager system 160. Operational purchasing system 170 includes planned OTB data 172 and actual OTB data 174. Planned OTB data may include OTB plan data 116 received by operational purchasing system 170 from back end system 110. Operational purchasing system 170 uses planned OTB data 172 and actual OTB data 174 to determine whether budgeted funds are available such that a purchase order may be generated for a particular grouped order document 164.

OTB procurement system 180 is in communication with order manager system 160 and operational purchasing system 170 and is configured to provide options for successfully generating a purchase order for grouped procurement document 164 when OTB check 166 is not successful. For example, in the illustrated embodiment, OTB procurement system 180 includes OTB dialog 182, which provides options to either initiate a special release 184 or a purchase order change 186. When special release 184 is initiated, grouped procurement document 164 is forwarded to, for example, an appropriately authorized individual for approval. When purchase order change 186 is initiated, grouped procurement document 164 may be modified. Such modifications may include changes in quantities, changes in delivery dates, changes in price, etc.

Referring now to FIG. 2, a worklist selection screen 200 is shown, according to an exemplary embodiment. The worklist selection screen may be accessed through order manager system 160 to generate a worklist of purchase orders. Worklist selection screen 200 is configured to allow a user to select a worklist of purchase orders based on a personal variant. The worklist of purchase order may be automatically populated according to some criteria, such as purchase orders requiring some action within the next 7 days, or may be manually populated by a user. The personal variant may be search parameters to be used in populating the worklist, such as the organization, the type of purchase orders, purchasing organization, purchasing group, order date, delivery date, vendor, material, plant, plant category, firm deal indicator, release indicator, order type, etc. The search parameters may be displayed in a listing of user defined input fields 205, allowing the user to populate the input fields with search criteria that are currently of interest. The personal variant may further include additional user-defined parameters. For example, a user may wish to a set of user defined variables indicating the display format to be used in display the purchase orders. Upon selection, a user may save the personal variant to be used in future generation of worklists. Alternatively, a user may select from a previously created personal variant. For example, worklist selection screen 200 illustrates a personal variant pop up window 210 listing previously defined personal variants.

Referring now to FIG. 3, an worklist interface 300 configured to allow a user to manage purchase orders is shown, according to an exemplary embodiment. Worklist interface 300 may be configured to display the purchase orders for which a user is currently responsible. The purchase orders may be ordered and displayed according to any useful criteria. For example, as shown in FIG. 3, worklist interface 300 is configured to display a plurality of purchase orders in a hierarchical listing 310. The hierarchical listing 310 may include divisions or branches according to a sort criteria selected by the user. Potential sort criteria may include and is not limited to, a purchase order date, a purchase order principal, a purchase order vendor, etc. According to an alternative criteria, the listing of purchase orders may be further sorted according to the calculations made regarding the purchase orders by one or more purchase order management applications. For example, the purchase order may be sorted according to purchase orders that have failed budgetary constraint using a open-to-buy budget approval application or workbench, purchase order that are scheduled to be delivered based on results obtained from a procurement application or workbench, etc. Purchase orders may further be sorted according to the workload of the user, worklist interface 300 may be configured to display all of the purchase orders requiring immediate action by the user of interface 300.

Worklist interface 300 may further be configured to display a listing of information or status indicators associated with the displayed purchase orders. For example, as shown in FIG. 3, worklist interface 300 may be configured to display each purchase order that is displayed in hierarchical listing 310 including status columns 315. Exemplary status information may include a delivery status, a release status, aggregated cost data, the currency used in displaying the costs, etc. The information may be displayed using text, icons, or any other type of indicator.

Figure 4:
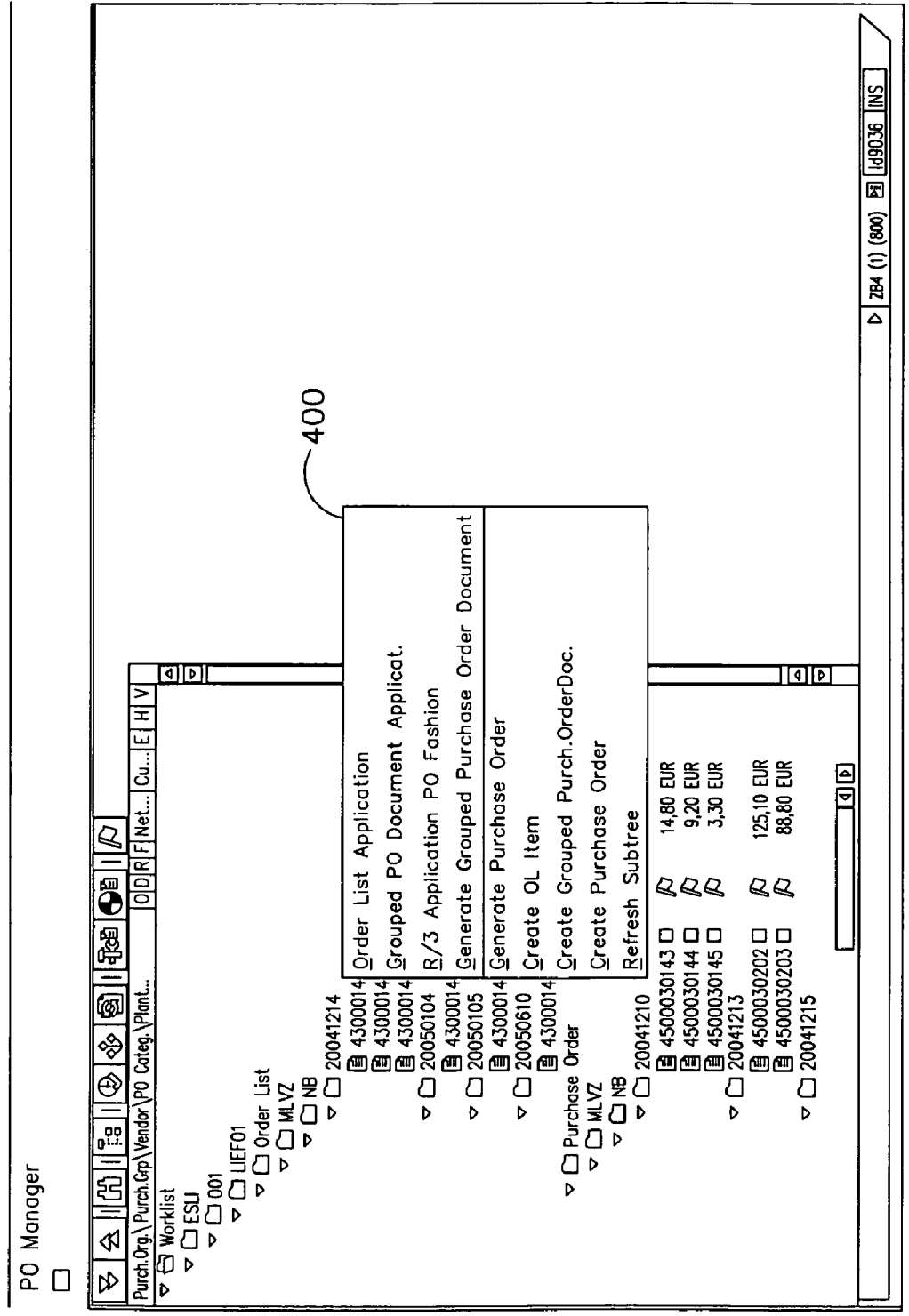
FIG. 4 is the worklist interface of FIG. 3, configured to allow a user to perform one or more functions associated with the purchase order list in the worklist, according to an exemplary embodiment.

Referring now to FIG. 4, worklist interface 300 may be configured to allow a user to perform one or more functions associated with the purchase order in the worklist. As shown in FIG. 4, a user may select one or more purchase orders in hierarchical listing 310 and perform a right click to display a listing 400 of functions that can be performed on the selected purchase orders. Exemplary function associated with listing 400 may include, but are not limited to, generating a grouped purchase order document, generating a purchase order, creating an OL item, creating a grouped purchase order document, and creating a purchase order. Listing 400 may further include links to additional applications including functionality that may be performed on the purchase orders. The applications may include, but are not limited to, an order list application, a grouped purchase order application, a R/3 application purchase order, etc. Alternatively, listing 400 may be displayed in a toolbar that is displayed at the top of interface 300 upon selection of the one or more order list items. For example, the user may select the application to create a purchase of grouping.

Figure 5:
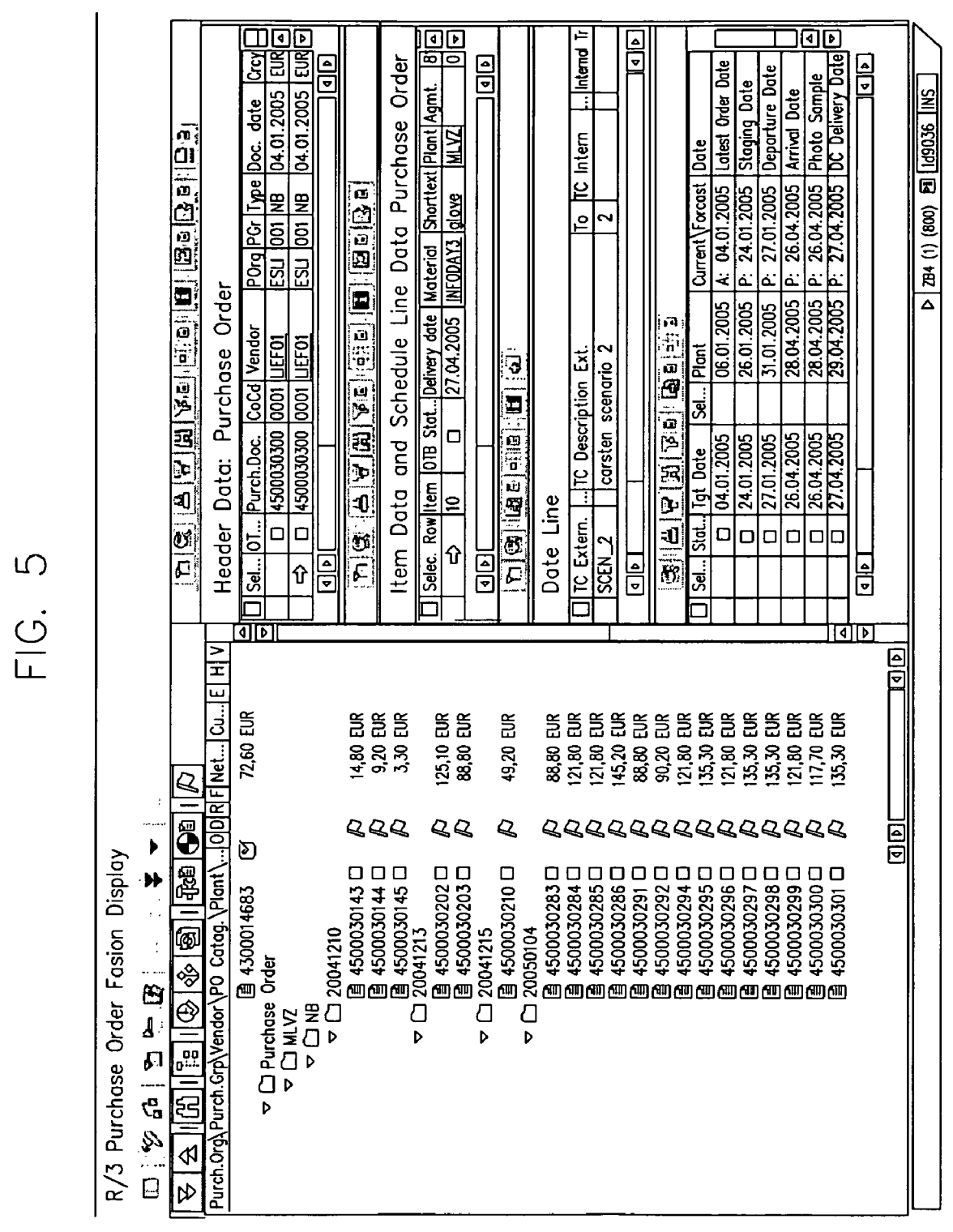

Referring now to FIG. 5, upon selection of an application to be performed on the selected order list items, an application interface 500 may be opened displaying the application interface of the application or function selected from listing 400. The application interface may be automatically populated with information based on the selected order list items shown in FIG. 4.

Figure 6:
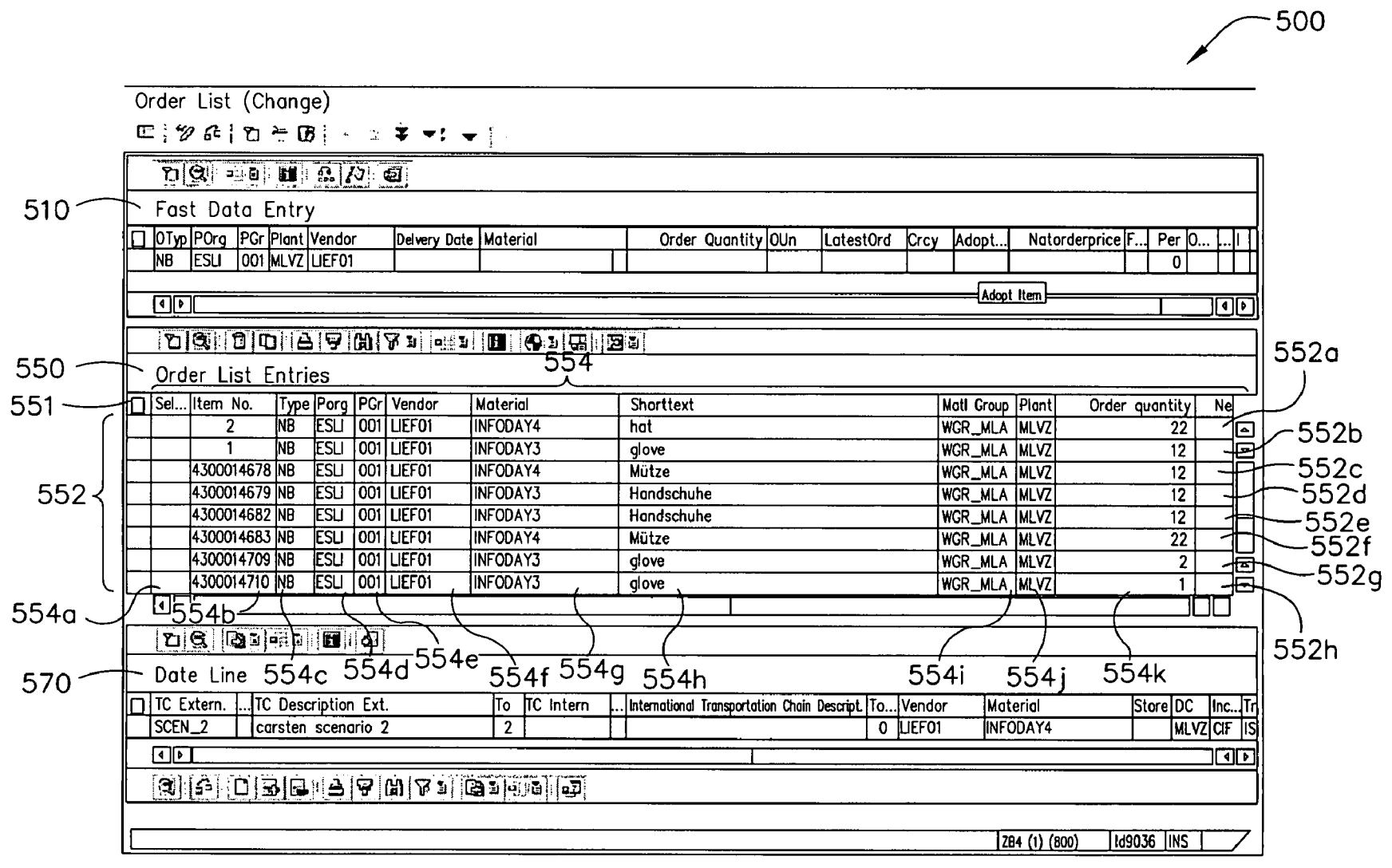

Referring now to FIG. 6, if desired, the user may close hierarchical listing 310 such that only the application interface 500 is displayed in interface 300. According to the example shown in FIG. 6, the application is a purchase order generator and application interface 500 becomes an order generator interface. Purchase order generator interface 500 is shown as including a fast data entry interface 510, a purchase order list 550, and a date line interface 570. Although a particular interface is shown in a particular configuration within purchase order generator interface 500, it should be understood that the interface can be provided according to any configuration, and any type of interface configured to implement or facilitate the function described herein can alternatively be provided.

In the illustrated embodiment, purchase order list 550 is formatted as a table. Purchase order list 550 includes a header row 551 as well as a row 552 for each purchasing list item added to the purchase order list. For example, in the illustrated embodiment, purchase order list 550 includes rows 552a-552h. Purchase order list 550 also includes columns 554 for relevant purchasing data associated with each purchasing list item in the purchase order list. For example, in the illustrated embodiment, purchase order list 550 includes columns 554a-554k. Column 554b, labeled "Item No." in header row 551, includes the item number from which the purchase order list line item was generated. The item number may be representative of an Stock Keeping Unit (SKU) number. Column 554f, labeled "Vendor" in header row 251, lists the vendor for each purchase order list line item. In addition to the column labels provided in FIG. 6, purchase order list 550 may include an "Item" column having the purchasing list line item number for each purchasing list item in the purchase order list, an "Origin" column having the origin of each purchase order list line item, an "Article" column having the specific article number for each purchase order list line item, a "Latest PO Date" column listing the latest possible date that a purchase order may be generated for each purchase order list line item, a "Delivery Date GR Ramp column having the required delivery date for each purchase order list line item, a "Price" column having the price for each purchase order list line item, a "Quantity" column having the required quantity for each purchase order list line item, a "UoM" column having the appropriate unit of measure for each purchase order list line item (e.g., cartons, pieces, etc.) and a "Site" column listing the delivery destination for each purchase order list line item. Of course, in other embodiments, additional, fewer, and/or different columns and rows of information or data may be displayed.

Referring now to FIG. 7, purchase order generator interface 500 may further be configured to allow a user to select one or more purchase orders and select a function to be performed using those purchase order. For example, as shown in FIG. 7, purchase order list 550 may be displayed to a user as part of a purchase order generator interface 500, according to an exemplary embodiment.

Figure 8:
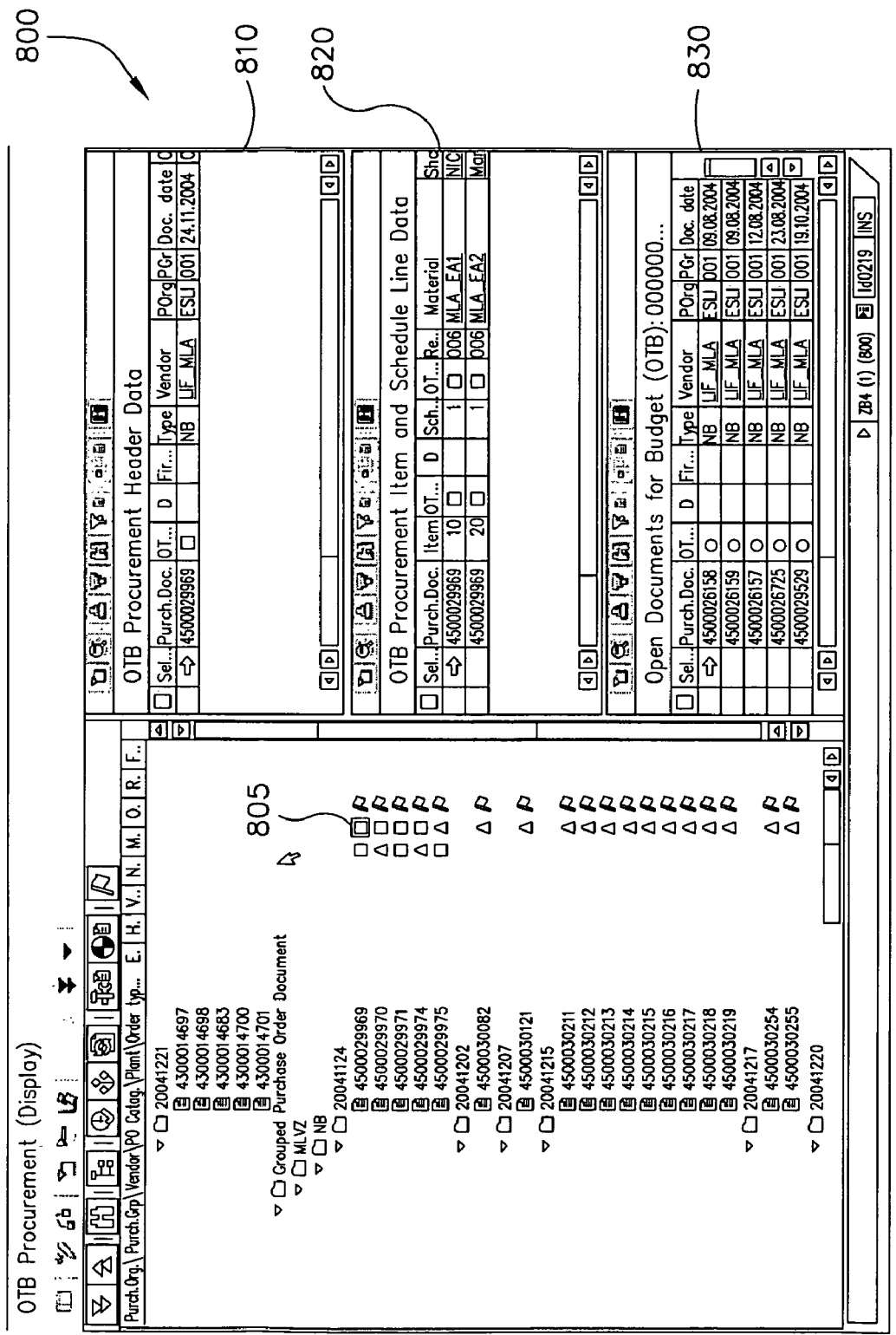
FIG. 8 is an OTB procurement system interface configured to allow a user to procure financing for a purchase order based on the success or failure of an OTB check, according to an exemplary embodiment.

Referring now to FIG. 8, an OTB procurement system interface 800 configured to allow a user to procure financing for a purchase order based on the success or failure of OTB check 166, shown and described above with reference to FIG. 1, is shown, according to an exemplary embodiment. Advantageously, OTB procurement system interface 800 may be displayed based on the selection of an OTB status check icon displayed in listing 400, shown as icon 805 in FIG. 8. In particular, OTB procurement system interface 800 may be displayed when a user clicks on a red OTB status icon. The red OTB status icon is indicative of a lack of available funds based on current financing selected for the purchase order.

OTB procurement system interface 800 include an OTB procurement header interface 810, configure to display top-level data related to the OTB check. OTB procurement header interface 810 may include columns listing the purchasing document, the results of OTB check 166, the type of purchasing document, the Vendor associated with the purchasing document, the purchasing organization, the purchasing group, the purchasing document date, etc. OTB procurement system interface 800 further includes an OTB Procurement Item and Schedule Line Data Interface 820. Additionally, OTB procurement system interface 800 further includes an Open Documents for Budget Bucket Interface 830 configured to allow a user to view open documents that may be utilized to satisfy procurement requests in the event of a failed OTB check.

A user may utilize OTB procurement system interface 800 to initiate OTB dialog 182, which provides options to either initiate a special release or a purchase order change. The special release and/or the purchase order change may include actuating another application to perform the function. Advantageously, information may be automatically incorporated in both OTB procurement system interface 800 and in the function to be called based on the OTB check 166 failure.

Figure 9:
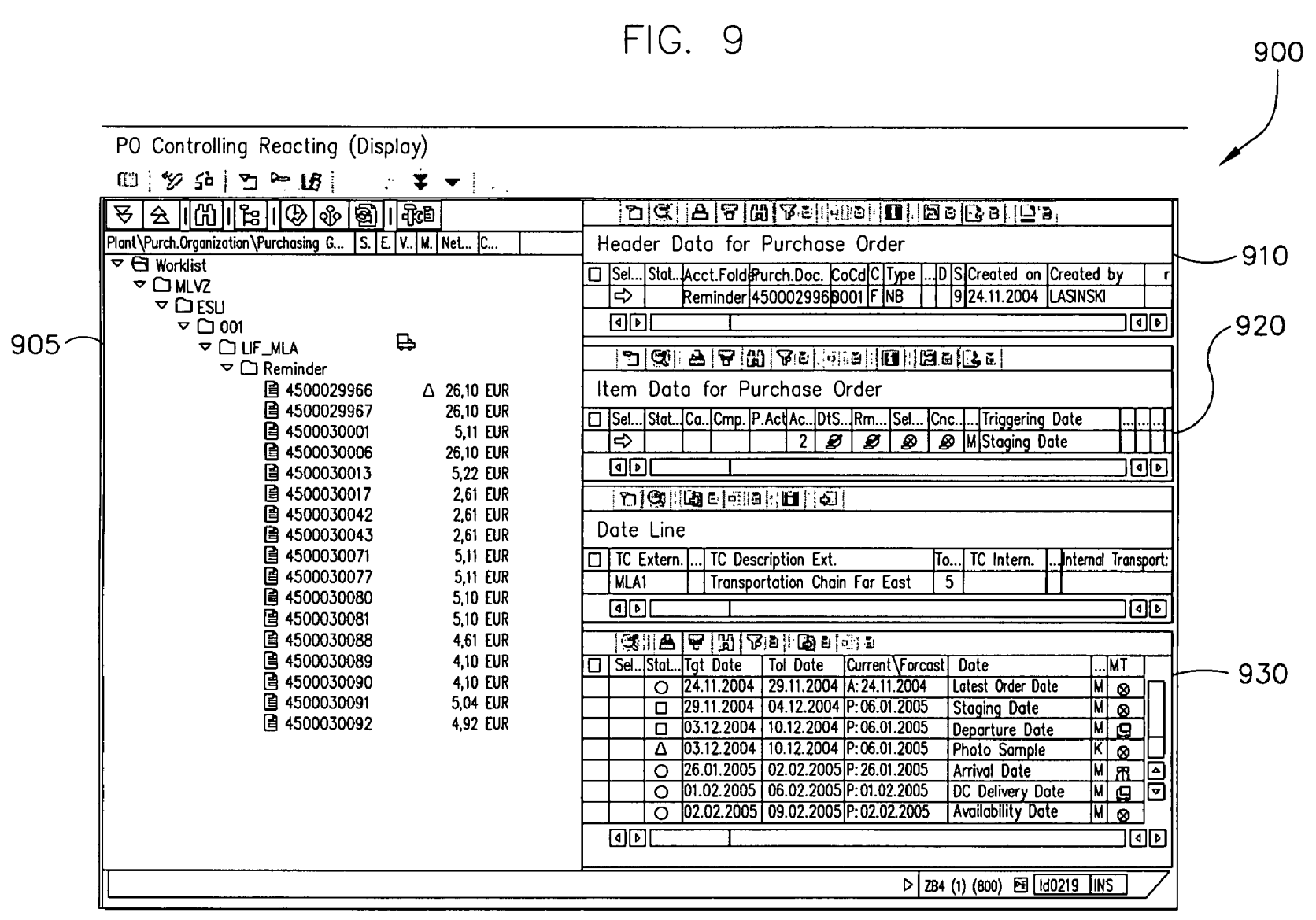

Referring now to FIG. 9, a purchase order controlling interface 900 configured to allow a user to maintain and perform functions associated with purchase orders based on events that have occurred related to the purchase orders is shown, according to an exemplary embodiment. Purchase order controlling interface 900 may be accessed from a drop down menu displayed in worklist interface 300 or by selecting an icon in listing 400. Purchase order controlling allows a user to perform a function based on an event that has occurred related to a purchase order. Exemplary events may include changes to a purchase order, a delay in shipment, a change in projected sales that reduces a need for an item, etc.

Purchase order controlling interface 900 includes a hierarchical listing 905 of purchase orders for which an event has occurred. Hierarchical listing 905 may be automatically populated based on a saved or a user entered search criteria. Exemplary search criteria may include searches based on event dates, type of events, responsible person, etc. Hierarchical listing 905 may also be configured to display data providing an overview of information associated with each purchase order in the listing. Exemplary data may include purchase order data, net purchase order value, purchase order currency, etc.

Purchase order controlling interface 900 further includes a procurement header data interface 910 for the purchase order. Procurement header interface 910 may include columns listing the purchasing document, the results of OTB check 166, the type of purchasing document, the Vendor associated with the purchasing document, the purchasing organization, the purchasing group, the purchasing document date, etc.

Purchase order controlling interface further includes an item data interface 915 configured to allow the user to, for example, perform purchase order cancellation, transmittal of a reminder to a vendor, etc.

Additionally, purchase order controlling interface 900 includes an purchase order event listing 920 for the elected purchase order. Event listing 920 is configured to display all of the events that have occurred related to the selected purchase order and data associated with the event. Exemplary data may include a target delivery date, a tolerance delivery date, a forecast delivery date, etc. The information may be displayed using text, icons, etc.

Event listing 920 may further include links configured to allow a user to perform functions or start new applications based upon the events. For example, wherein an event is a failed delivery date, event listing 920 may include a link to a purchase order generator configured to allow the user to create a new purchase order, to account for the failed delivery.

The use of a purchase order list provides the advantage of organizing purchasing data for retail sales articles and/or services to be purchased such that the generation of purchase orders for these articles and/or services may be conveniently managed. Improved purchase order management and organization is achieved by providing for the sorting of sales articles or services in the purchase order list according to a particular type of purchasing data related to the sales articles or services in the list, such as required order and delivery dates. Improved purchase order management and organization is further achieved by providing for the updating of the purchase order list to include data related to a specific purchase order generated for a particular retail sales article or service. In this way, a business may carefully plan and schedule purchase orders for retail sales articles and services to ensure on-time procurement or scheduling.

In an exemplary embodiment, the consideration of dynamic stock may use valid stock values in operative applications, dynamic (calculated) stock values, and not the current stock value. Further, the dynamic stock value may take into account all stock-relevant events. For example, material movements may be a stock transport order which may result in an increase in stock. Further, material movements may be a return order which may result in a reduction in stock. In another example, material movements may be an open allocation table which may result in an increase or decrease in stock. Further, material movements may be a returns allocation table which may result in an increase or decrease in stock. In another example, material movements may be transfers which may result in an increase or decrease in stock. Further, material movements may be a planned turnover which may result in a reduction in stock. In an exemplary embodiment, some functions of the allocation strategy may be an analysis level from the article hierarchy, a minimum variance from the existing value, a maximum variance from the existing value, a minimum value for each store from the article master, a maximum value for each store from the article master, and a fixed item quantity.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented system for managing a purchasing order for an item to be purchased, the system comprising:
   a plurality of applications stored in computer-readable media and one or more processors that execute the applications, the applications including
   a purchase order management interface application, the purchase order management interface configured to display data associated with the purchase order;
   a purchase order generation application configured to generate a purchase order list for a store, the purchase order list includes the item, the purchase order generation application configured to generate the purchase order for the store based on the purchase order list, the purchase order list being based on event-driven information including a stock transfer order, a return order, an open allocation table, a returns allocation table, transfer data, and a planned turnover, the purchase order list being further based on a minimum product value for the store, a maximum product value for the store, a minimum variance for the product value, and a maximum variance for the product value, the purchase order generation application configured to allow a user to modify an existing purchase order;
   a purchase order procurement application, the purchase order procurement application configured to compare a cost of the purchase order to a budget, the purchase order procurement application configured to determine that the cost of the purchase order exceeds the budget, the purchase order procurement application configured to transmit a request for an approval signal based on the cost of the purchase order exceeding the budget, the purchase order procurement application configured to receive the approval signal, and the purchase order procurement application configured to transmit the purchase order based on the approval signal, the purchase order procurement application configured to transfer the item to a procurement document based on the purchase order being transmitted and to transmit a confirmation based on the purchase order being transmitted, the purchase order procurement application being further configured to remove the item from the purchase order list based on the confirmation; and
   an event-driven purchase order controlling application configured to allow the user to review existing purchase orders for the event-driven information related to the purchase order;
   wherein the approval signal comprises instructions for approving the purchase order when the cost of the purchase order exceeds the budget.

2. The system of claim 1, wherein modification of any information associated with the purchase order in the purchase order management interface causes a correlating change in the data associated with the purchase order in each application.

3. The system of claim 1, wherein the purchase order management interface is configured to display purchase order information sorted according to different types of purchasing data.

4. The system of claim 3, wherein the purchase order information is configured to be sorted using a graphical user interface.

5. The system of claim 1, wherein each application may be actuated using the purchase order management interface.

6. The system of claim 5, wherein each application is automatically provided with input data for that application when actuated from the purchase order management interface.

7. The system of claim 1, wherein the purchase order is a purchase order for retail sales articles.

8. The system of claim 7, wherein the purchase order includes planned purchasing quantities for selected planning levels.

9. The system of claim 8, wherein each planned purchasing quantity in the purchasing list is specific to a store delivery date and assortment.

10. The system of claim 9, further including multiplying each planned purchasing quantity in the purchasing list by a number of stores in the assortment to obtain a corresponding total purchasing quantity for an assortment purchase order list.

11. A computer-implemented system for managing a purchasing order for an item to be purchased, the system comprising:
    a plurality of applications stored in computer-readable media and one or more processors that execute the applications, the applications including
    a purchase order management interface means for displaying data associated with the purchase order;
    a purchase order generation means for generating a purchase order list for a store, the purchase order list includes the item, the purchase order generation means generating the purchase order for the store based on the purchase order list, the purchase order list being based on event-driven information including a stock transfer order, a return order, an open allocation table, a returns allocation table, transfer data, and a planned turnover, the purchase order list being further based on a minimum product value for the store, a maximum product value for the store, a minimum variance for the product value, and a maximum variance for the product value, the purchase order generation means allowing a user to modify an existing purchase order;
    a purchase order procurement means for comparing a cost of a purchase order to a budget, the purchase order procurement means configured to determine that the cost of the purchase order exceeds the budget, the purchase order procurement means configured to transmit a request for an approval signal based on the cost of the purchase order exceeding the budget, the purchase order procurement means configured to receive the approval signal, and the purchase order procurement means configured to transmit the purchase order based on the approval signal, the purchase order procurement means configured to transfer the item to a procurement document based on the purchase order being transmitted and transmitting a confirmation based on the purchase order being transmitted, the purchase order procurement means configured to remove the item from the purchase order list based on the confirmation; and
    an event-driven purchase order controlling means for allowing the user to review existing purchase orders for the event-driven information related to the purchase order;

wherein the approval signal comprises instructions for approving the purchase order when the cost of the purchase order exceeds the budget.

12. The system of claim 11, wherein the displayed data includes at least one of an item identifier, a quantity, a price, an order date, a delivery date, and a delivery location.

13. The system of claim 11, wherein modification of any information associated with a purchase order in the purchase order management interface means causes a correlating change in the data associated with the purchase order in each of the purchase order generation means, the purchase order procurement means, and the event-driven purchase order controlling means.

14. The system of claim 11, wherein the purchase order management interface means is configured to display purchase order information sorted according to different types of purchasing data.

15. The system of claim 14, wherein the purchase order information is configured to be sorted using a graphical user interface.

16. The system of claim 11, wherein each of the purchase order generation means, the purchase order procurement means, and the event-driven purchase order controlling means may be actuated using the purchase order management interface means.

17. The system of claim 16, wherein each of the purchase order generation means, the purchase order procurement means, and the event-driven purchase order controlling means is automatically provided with input data when actuated from the purchase order management interface means.

18. The system of claim 11, wherein the purchase order is a purchase order for retail sales articles.

19. The system of claim 18, wherein the purchase order includes planned purchasing quantities for selected planning levels.

20. The system of claim 19, wherein each planned purchasing quantity in the purchasing list is specific to a store delivery date and assortment.

* * * * *